June 9, 1959 IN-MEEI NEOU 2,889,626

MECHANICAL INTEGRATOR

Filed Oct. 24, 1955 2 Sheets-Sheet 1

INVENTOR.

BY In-Meei Neou

June 9, 1959

IN-MEEI NEOU 2,889,626

MECHANICAL INTEGRATOR

Filed Oct. 24, 1955

2 Sheets-Sheet 2

INVENTOR.

In-Meei Neou

BY

United States Patent Office 2,889,626

Patented June 9, 1959

2,889,626

MECHANICAL INTEGRATOR

In-Meei Neou, Bridgeport, Conn.

Application October 24, 1955, Serial No. 542,223

3 Claims. (Cl. 33—1)

This invention relates to a multi-purposed mechanical integrator for performing the integration of $$I_1=\int F(Y)dA \quad (1)$$

and $$I_2=\int F_1(X)F_2(X)dX \quad (2)$$

where

A is the area bounded by a curve,
F(Y) may be a constant, $y$, $y^2$, $$\frac{1}{y}$$

etc. as the case requires,
$F_1(X)$ and $F_2(X)$ are ordinates of two given curves.

One object of the invention is to determine the area ($\int dA$), the moment of area ($\int YdA$), the moment of inertia of area ($\int y^2dA$), $$\int\frac{dA}{y}$$

etc. of irregular figures.

Another object is to provide an integrator capable of continuously plotting the output mechanically or electrically.

A further object is to provide an integrator capable of evaluating the product of the ordinates of two curves $F_1(X)$ and $F_2(X)$.

A still further object is to adapt the integrator to be used as a harmonic analyzer for evaluating Fourier coefficients from a given curve.

In the drawings wherein like reference characters indicate like parts:

Figure 1:
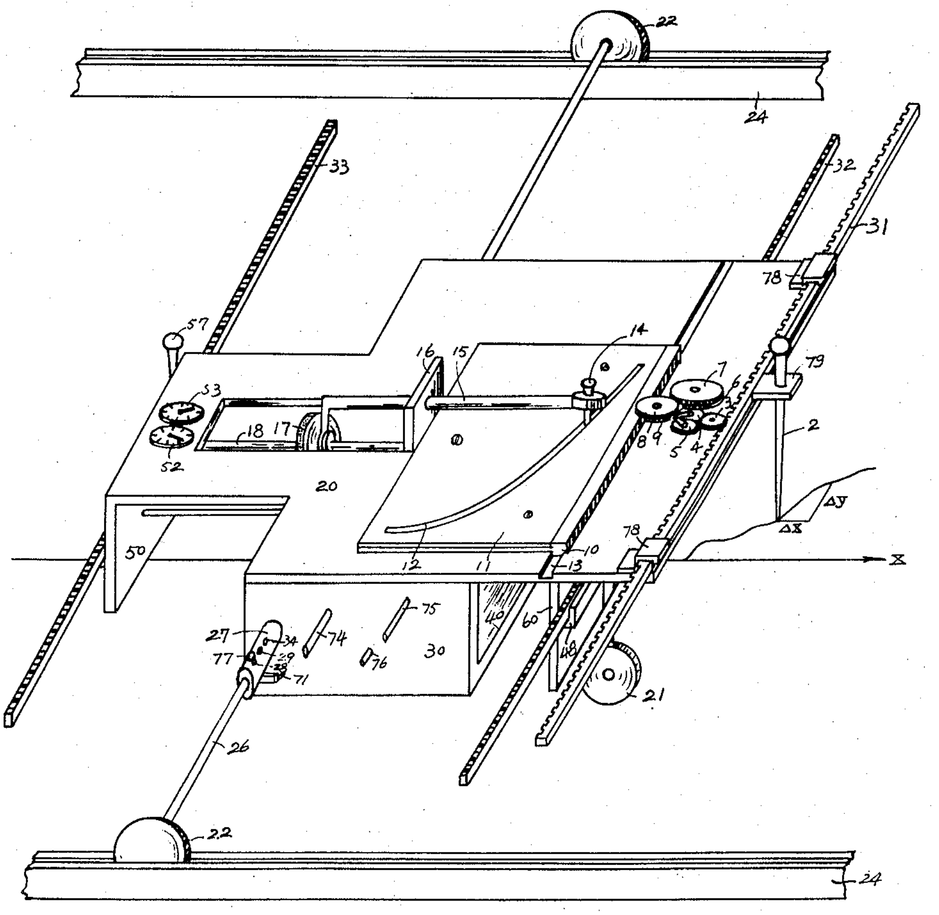
Fig. 1 is a pictorial view of the integrator, tracks and drawing board.

Referring to the drawings, the mechanical integrator consists essentially of a carriage, a tracing stylus, a gear pantograph, a roller-and-disc integrator, plate cams of various functions, mechanical and electrical output indicators, a plotting pen, a mechanism for using the ordinate of a curve as an input and a mechanism for converting the longitudinal movement of the carriage into harmonic motion of the input disc.

Figure 2:
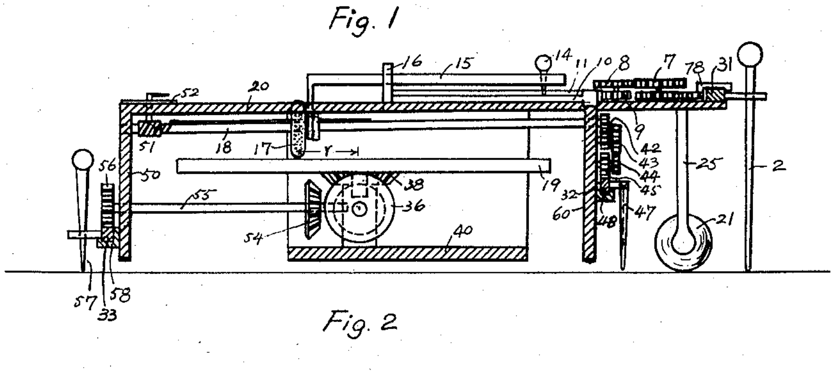
Fig. 2 is a sectional view of the integrator taken just inside the plate 30 of the carriage in Fig. 1.
Figure 3:
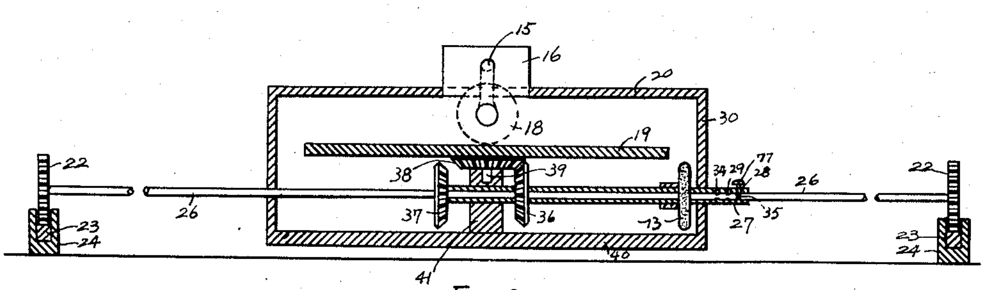
Fig. 3 is a transverse sectional view of the integrator taken along the center line of the shaft 26 in Fig. 1.

Referring to Figs. 1, 2, and 3, as the tracing stylus 2 follows a given curve, the carriage 20 is compelled to move longitudinally along X-axis on its two supporting wheels 21 and two gears 22 which roll over racks 23 in channel tracks 24. At the same time, movement of the tracing sylus 2 forces the rack 31 to move transversely.

As gears 22 are fixed on the shaft 26, and the sleeve 27 can be made fast on the same shaft by tightening the set screw 77 in its hole 28 and in the groove 35 in the shaft, rolling of gears 22 will cause the bevel gear 36 on the sleeve 27 to rotate. The gear 36 in turn drives a bevel gear 38 affixed to the input disc 19. The stub shaft 39 of the disc rests and rotates freely in the vertical journal of and extended post 41 of the bottom plate 40 of the carriage. The post 41 also provides a bearing for the shaft 55 and a through hole for the passage of the sleeve 27 and the shaft 26. For a displacement $dX$ along X-axis, the corresponding angular displacement of the disc 19 is $$d\theta_d=\frac{r_{36}}{r_{22}\cdot r_{38}}dX$$

where $r_{22}$, $r_{36}$, and $r_{38}$ are radii of pitch circles of gears 22, 36, and 38 respectively.

The transverse movement of rack 31, guided by blocks 78 with openings at the right for the passage of the lug 79 of the stylus 2, sets in motion gears 3, 4 (or 4 and 5), 6, 7, 8, and 9 forming a gear pantograph. Gear 9 is in mesh with the teeth on the side of a slider 10. A plate cam 11 is placed on top of the slider 10 by three set screws. The profile of the cam grove 12 is so constructed as to represent the relation between $y$ and $$\frac{1}{k_c}\int F(y)dy$$

in which $k_c$ is a properly chosen cam scale constant. The integral Eq. 1 can be transformed into $$I_1=\iint F(y)dYdX=k_c\int\left[\frac{1}{k_c}\int F(k_dy)d(k_dy)\right]dX \quad (3)$$

where $k_d$ is a drawing scale constant of the gear pantograph, depending on the gear ratios of gears 7 and 8. For instance: when $F(Y)=Y^2$, Eq. 1 becomes $$I_1=\iint Y^2dYdX$$
$$=\int\left[\int (k_dy)^2d(k_dy)\right]dX=k_ck_d^3\int\left[\frac{y^3}{3k_c}\right]dX \quad (4)$$

a curve of $y$ versus $$\frac{y^3}{3k_c}$$

is plotted and used as a profile for the cam groove 12 for determining the moment of inertia of area of an irregular figure. When the plate cam 11 moves transversely, the cam groove 12 constrains the pin 14 of the cam follower 15 and hence the integrating roller 17 to move longitudinally. The roller 17, slidable on the spline of output shaft 18, is positioned at $$r=\frac{1}{k_c}\int F(y)dy$$

from the center of the disc 19. The rotation of roller 17 as induced by the rotation of discs 19 is therefore:

$$\theta_r=\int\frac{r}{r_{17}}d\theta_d=\frac{r_{36}}{r_{22}\cdot r_{38}\cdot r_{17}}\int rdX=\frac{1}{k_r}\int rdX \quad (5)$$

where $r_{17}$ is the radius of roller 17 and $$kr=\frac{r_{22}\cdot r_{38}\cdot r_{17}}{r_{36}}$$

The total amount of rotation $\theta_r$ can be read from the dials of a revolution counter 53 and a fractional revolution counter 52 which is driven by a worm 51 in mesh with the threaded end of the output shaft 18. The integral of Eq. 4 now becomes:

$$I_1=k^3_d k_c k_r \theta_r$$

A continuous plot of the output $\theta_r$ can be obtained by letting the gear on the right end of the output shaft 18 drive gears 42, 43, 44 and 45 and a rack 32 in the channel 48 affixed to the skirt 60 underneath the carriage plate 20 (Fig. 2). The rack 32 carries a plotting pen 47 in its middle. The size of an output diagram can be adjusted by using proper gear ratios of gears 42 and 43.

Figure 10:
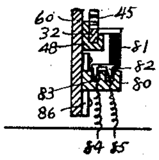
Fig. 10 is a sectional view of the mercury rheostat.
Figure 9:
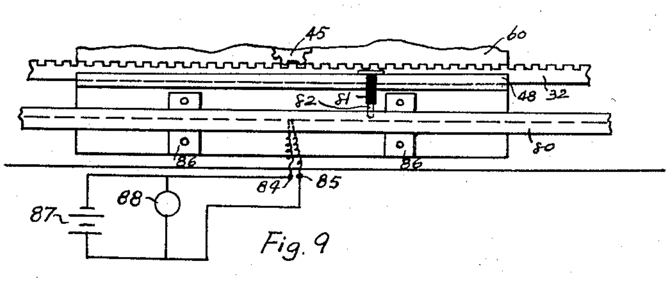
Fig. 9 is a left side view of a mercury rheostat.

The output may also be recorded or transmitted electrically. The plotting pen 47 is now replaced by a short stylus 81 of insulation material (Figs. 9 and 10). The two prongs of a metalic fork 82 at the bottom of the stylus 81 dip into their respective mercury circuits in an insulating cross channel 80 affixed to the skirt 60 of the carriage. Wire leads 84 and 85 at the center of channel 80 are connected to a recording circuit which consists essentially of a standard battery 87 and a recording instrument 88, such as a galvanometer with a pen for recording deflection of its hand. The recording instrument records the voltage drop across the leads 84 and 85 in proportion to the change in resistance in the mercury circuit 84—82—85.

The same plate cam 11 can be used for the portions of a curve both above and below the X-axis, if the direction of movement of the slider be reversed by letting the gear 3 drive the gear 6 through the gear 4 when the curve traced is above the X-axis and through gears 4 and 5 when the curve is below the X-axis.

A change of direction of the disc 19 can also be effected by having the sleeve 27 (Fig. 3) disposed to the right until hole 34 is brought to face the groove 35 in the shaft 26 and fixed there by the set screw 77. The bevel gear 37, instead of the bevel gear 36, is now in mesh with the bevel gear 38. When the disc 19 rotates in one direction, the individual outputs of the portions of a curve above and below the X-axis are all positive. If the direction of rotation of the disc 19 is reversed when the stylus 2 traces the portions of the curve below the X-axis, their individual outputs are all negative and hence subtracted from the positive outputs of the curve, resulting in a net output.

For evaluating the integral given by Eq. 2, in which $F_1(x)$ and $F_2(x)$ are given in the form of curves. The integral can be transformed into $$I_2=\int F_1(X)\,d[\int F_2(X)\,dX] \qquad (6)$$

Figure 4:
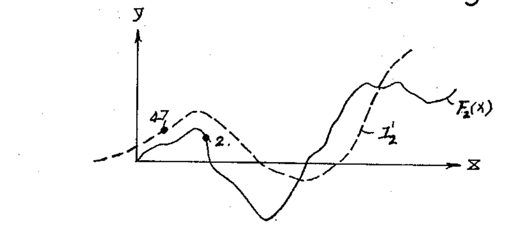
Fig. 4 is a diagrammatic showing of an input curve $F_2(X)$ and the output curve $I_2'$ of the area under $F_2(X)$.
Figure 5:
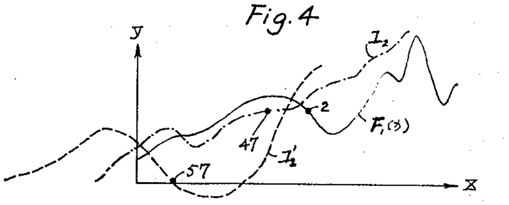
Fig. 5 is a diagrammatic showing of the two input curves $F_1(X)$ and $I_2'$ together with the output curve $I_2$ from them.
Figure 6:
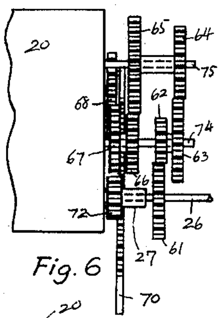
Fig. 6 is a fragmentary top view of a gear train and a Scotch yoke attached to the integrator when used as a harmonic analyzer.

The first step is to perform the integration of $I_2'=\int F_2(X)\,dX$, using an area cam (Fig. 4). The output curve $I'_2$ is then placed side by side with curve $F_1(x)$ along the X-axis, the starting point of curve $I_2'$ being off-set to the left of $F_1(x)$ by a distance equal to that between the tracing stylus 2 and a second tracing stylus 57 (Fig. 5). While the tracing stylus 2 follows curve $F_1(x)$, the tracing stylus 57 is made to trace the curve $I_2'$. As the stylus 57 is attached to rack 33 in the channel 58 affixed to the side plate 50, the transverse movement of stylus 57 will cause the gear 56, the shaft 55 and hence the gear 54 to rotate. By pushing the bevel gear 54 onto the right to engage either the gear 36 or 37 and letting the sleeve 27 loose on the shaft 26 by loosening the set screw 77 in the groove 35 and hole 28 or 34, the bevel gear 38 and hence the disc 19 will derive their driving power from the shaft 55, instead of from the shaft 26. The increment of rotation $d\theta_d$ of the disc 19 is thus proportional to the transverse increment $dY$ of curve $I_2'$ or $d[\int F_2(X)\,dX]$. The output of the integrating roller 17 is therefore $$\theta_r=\frac{1}{r_{17}}\int r\,d\theta_d=\frac{1}{r_{17}}\int r\,d\left[\int F_2(X)\,dX\right] \qquad (7)$$

in which the distance $r$ is proportional to $F_1(X)$ and regulated by an area cam. The curve $I_2$ therefore represents a continuous plot of the output $I_2=\int F_1(x)F_2(x)\,dx$.

The instrument with additional equipment can also be used as a harmonic analyzer for evaluating Fourier coefficients from a curve. By loosening the set screw 77 in the groove 35, the sleeve 27 becomes loose on the shaft 26. Rotation of shaft 26 is transmitted to the disc 19 through a train of gears 61, 62, 63, 64, 65, 66, 67, 68 forming a gear pantograph, a Scotch yoke 70, gears 72, 36, or 37 on sleeve 27. All the gears on stub shafts 74, 75, and 76, affixed to the plate 30, are loose on their respective shafts while gears 61 and 72 are fast on the shaft 26 and the sleeve 27 respectively. Driven by a pin 69 on the gear 68 and guided by a bracket 71 affixed to the plate 30, the Scotch yoke converts rotatory motion into harmonic motion. Reduce or enlarge a given curve to a proper size and select proper gear ratios for gears 63 to 66, so that when the tracing stylus 2 covers one wave length of the curve, the Scotch yoke performs one complete reciprocating motion. Later, the gear ratios should be changed so that the Scotch yoke performs $n$ complete cycles of reciprocating motion in one wave length of the curve. The rotation $\theta_d$ of the disc 19 corresponding to a travel X of the carriage is thus $$\theta_d=\frac{r_{36}}{r_{38}\cdot r_{72}}\cdot R\cos\frac{2n\pi X}{L} \qquad (8)$$

where $L$=the wave length of a given curve.

$R$=the distance between the pin 69 and the center of gear 68.

$n$=integers (1, 2, 3, . . .)

$$\frac{2n\pi}{L}=\frac{1}{r_{22}}\cdot\frac{r_{61}\cdot r_{63}\cdot r_{65}\cdot r_{67}}{r_{62}\cdot r_{64}\cdot r_{66}\cdot r_{68}}$$

and $r_{36}$, $r_{38}$, etc. are radii of pitch circles of gears 36 38 etc. respectively.

Figure 8:
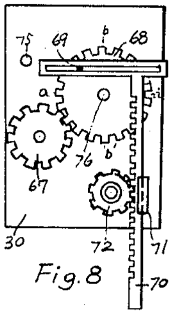
Fig. 8 is a fragmentary view showing the arrangement of gears 67, 68 and 72 and the Scotch yoke.

Hence the rotation of the roller 17 becomes $$\theta_{r_n}=\frac{r_{36}\cdot R}{r_{17}\cdot r_{38}\cdot r_{72}}\int_0^L r\,d\left(\sin\frac{2n\pi X}{L}\right)$$

if the Scotch yoke 70 starts from the position $aa'$ (Fig. 8) and $$\theta'_{r_n}=\frac{r_{36}\cdot R}{r_{17}\cdot r_{38}\cdot r_{72}}\int_0^L r\,d\left(\cos\frac{2n\pi X}{L}\right)$$

if the Scotch yoke starts from the position $bb'$.

Since the coefficients $A_0$, $A_n$ and $B_n$ in a Fourier Series $$f(x)=\frac{A_0}{2}+\sum_{n=1}^{\infty}A_n\cos\frac{2n\pi X}{L}+\sum_{n=1}^{\infty}B_n\sin\frac{2n\pi X}{L}$$

are obtained by $$A_0=\frac{2}{L}\int_0^L(X)\,dX$$

$$A_n=\frac{2}{L}\int_0^L f(X)\cos\frac{2n\pi X}{L}dX=\frac{1}{n\pi}\int_0^L f(X)\,d\left(\sin\frac{2n\pi X}{L}\right)$$

$$B_n=\frac{2}{L}\int_0^L f(X)\sin\frac{2n\pi X}{L}dX=-\frac{1}{n\pi}\int_0^L f(X)\,d\left(\cos\frac{2n\pi X}{L}\right)$$

A comparison of $A_n$ and $B_n$ with $$\theta_{r_n} \text{ and } \theta'_{r_n}$$

will reveal that by making $r$ proportional to the ordinates of a curve representing $f(X)$ and using an area cam, the outputs $$\theta_{r_n} \text{ and } \theta'_{r_n}$$

can be obtained, and hence $$A_n=\frac{1}{n\pi}\cdot\frac{r_{17}\cdot r_{38}\cdot r_{72}}{r_{36}\cdot R}\theta_{r_n}$$

$$B_n=-\frac{1}{n\pi}\cdot\frac{r_{17}\cdot r_{38}\cdot r_{72}}{r_{36}\cdot R}\theta'_{r_n}$$

Figure 7:
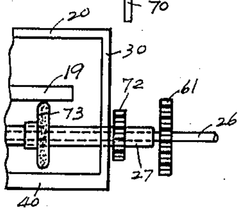
Fig. 7 is a fragmentary showing of the roller 73 being made to contact the disc when a change of rotating speed of the disc is desirable.

The coefficient $A_0$ can easily be obtained by letting the shaft 26 drive the sleeve 27 directly, and using an area cam for finding the net area between the X-axis and the curve. The disc 19 may also be driven by a roller 73 (Fig. 7), instead of through the bevel gear 36 or 37, if slower rotation of the dics 19 is desired. This is done by sliding the sleeve 27 until both bevel gears 36 and 37 are out of mesh with the gear 38, letting the set screw 77 loose in the groove 35 in the shaft 26 and pushing the roller 73 to contact the disc 19 at a desired distance from its center.

It should be remarked that the integrator and its variations can be employed to perform many other functions. Instead of making the carriage run over the diagrams or curves on a stationary board, the integrator can be made stationary while the input and output diagram sheets are wrapped on drums rotating synchronously under the stylus and the recording pen. If all the drums rotate synchronously and uniformly, the abscissas of the diagrams are also time scales. The input stylus may also be actuated by other mechanisms or physical quantities, such as the plunger of a cylinder, pressure, etc. and through the control of the plate cam of a prescribed function, the output can either be recorded on a paper on the rotating drum, or be used to control other physical quantities.

I claim:

1. In an integrator, in combination, a tracing stylus to follow an input curve, a gear pantograph connected to said stylus to adapt said integrator to various sizes of said curve, a carriage adapted to be moved longitudinally in tracks and carrying said gear pantograph, said stylus, a function-generating plate cam, an integrating roller and an input disc, indicating and recording means, said plate cam controlled by said gear pantograph and adapted to regulate positions of said integrating roller on said input disc, means for rotating said input disc proportional to the longitudinal movement of said carriage, and means responsive to the output of said integrating roller for operating said indicating and recording means.

2. In an integrator, in combination, a primary tracing stylus to follow a primary input curve and later a second input curve, a second tracing stylus adapted to trace an an off-set output curve from the first input curve, a gear pantograph connected to said primary stylus, a carriage adapted to be moved longitudinally in tracks and carrying said gear pantograph, said styluses, a function-generating plate cam, an integrating roller and an input disc, indicating and recording means, said plate cam controlled by said gear pantigraph and adapted to regulate positions of said integrating roller on said input disc, means for rotating said input disc proportional to the longitudinal movement of said carriage, means responsive to output of said integrating roller for operating said indicating and recording means and said second stylus.

3. In an integrator, in combination, a tracing stylus to follow an input curve, a gear pantograph connected to said stylus to adapt said integrator to various sizes of said input curve, a carriage adapted to be moved longitudinally in tracks and carrying said gear pantograph, said stylus, a plate cam, an integrating roller, an input disc, a Scotch yoke, and mechanical recording means, said Scotch yoke to transform longitudinal travel of said carriage in one period of said input curve into harmonic movement of various orders, and adapted to drive said input disc through a gear and a roller mounted on the same sleeve, said plate cam controlled by said gear pantograph and adapted to regulate positions of said integrating roller on said input disc, said mechanical means recording the output of said integrating roller.

References Cited in the file of this patent

UNITED STATES PATENTS

| | | |
|---|---|---|
| 1,205,068 | Weymouth | Nov. 14, 1916 |
| 1,875,019 | Koeppen | Aug. 30, 1932 |
| 2,232,086 | Van Den Akker | Feb. 18, 1941 |
| 2,614,327 | Russell | Oct. 21, 1952 |
| 2,765,981 | Neou | Oct. 9, 1956 |

FOREIGN PATENTS

| | | |
|---|---|---|
| 749,270 | Germany | June 8, 1953 |